United States Patent [19]

Woodard, Jr. et al.

[11] E Patent Number: Re. 32,078

[45] Reissued Date of Patent: Feb. 4, 1986

[54] ELECTRODES FOR ELECTROLYTIC CELLS

[75] Inventors: Kenneth E. Woodard, Jr., Cleveland, Tenn.; Ronald L. Dotson, Cheshire, Conn.

[73] Assignee: Olin Corporation, Cheshire, Conn.

[21] Appl. No.: 719,795

[22] Filed: Apr. 3, 1985

Related U.S. Patent Documents

Reissue of:

[64] Patent No.: 4,452,685
Issued: Jun. 5, 1984
Appl. No.: 490,612
Filed: May 2, 1983

[51] Int. Cl.[4] ..... C25B 1/34; C25B 11/00

[52] U.S. Cl. ..... 204/252; 204/278; 204/290 R; 204/290 F

[58] Field of Search ..... 204/252, 278, 290 R, 204/290 F

[56] References Cited

U.S. PATENT DOCUMENTS 4,098,606 7/1978 Despic et al. ..... 204/293
4,222,831 9/1980 Specht ..... 204/278

OTHER PUBLICATIONS

Data Sheet, "Use of Westinghouse LR-1 Joint Compound".

*Primary Examiner*—John F. Niebling
*Attorney, Agent, or Firm*—Ralph D'Allessandro; Donald F. Clements; Thomas P. O'Day

[57] ABSTRACT

An electrode for use in an electrolytic cell, and a method for producing same, wherein said electrode comprises an internal copper conductor and an external element of a second metal, at least a portion of each having contact surfaces being held in intimate contact with the other, said conductor and said element each having a conductive coating applied to the contact surface, said conductive coating comprising between about 20 and about 30 percent indium and between about 80 and about 70 percent gallium, whereby the contact resistance between said conductor and said element is reduced.

10 Claims, 2 Drawing Figures

ELECTRODES FOR ELECTROLYTIC CELLS

Matter enclosed in heavy brackets [ ] appears in the original patent but forms no part of this reissue specification; matter printed in italics indicates the additions made by reissue.

*This application is a reissue of U.S. Pat. No. 4,452,685.*

FIELD OF THE INVENTION

This invention relates to an improved electrode for use in chlor-alkali electrolytic cells and a method for producing same.

PRIOR ART STATEMENT

In view of the phenominal jump in energy prices and increased scarcity of industrial fuel supplies, there has been a continuous activity in the electrolysis field to found ways to reduce the amount of power used in electrolytic processes. In the chlor-alkali industry, such activity has been concerned with the development of dimensionally stable anodes, catalytic cathodes and advanced membrane cell structures, all of which, when combined, have resulted in significant decreases in the amount of energy required for per ton of product. In such cells, it is most important that the current density within the volumetric space between the anodes and the cathodes be as uniform as possible. This both minimizes wear and tear on the membrane and intends to maximize the production rate within the cell, all other conditions being equal. Such a condition is achieved by using anodic and cathodic structures which are adapted to uniformly distribute power across the surface area of the electrode. This is generally accomplished by building into the anode and cathode structures at least one, but more usually a plurality of central internal conductors usually of copper which are adapted to act as extensions of the associated bus bar power distribution system and promote even distribution of electric current throughout the external portions of the electrode structure.

In the design and operation of such a system, it is found that one factor which tends to limit the absolute quantity of current which can be so distributed is the contact resistance between the central conductors and the external electrode structure. The materials used for such a structure, normally titanium for anodes and nickel for cathodes, have substantially different electric conductivities as compared to copper. Further, in the case of titanium and nickel, there is a strong tendency to build up a thin oxide layer on the exposed surfaces, said layer being relatively nonconductive and resulting in rather significant contact resistance values between a central conductor and the external electrode structure. In recognition of this, a number of attempts have been made to produce electrode structures having lower contact resistance. These include such techniques as plating or coextruding an external coating of nickel or titanium onto the central copper conductor and then welding or bonding in some way the rest of the structure onto this external coating. In other designs, a thin film of copper may be sputtered onto the mating surfaces of the nickel and titanium electrode components to establish a nominally low resistance Cu—Cu couple at this interface. In still other cases, the components are tightly clamped together so that physical pressure tends to cause the oxide layer to break up, thus reducing the effective contact resistance between them. Such techniques have proven to be reasonably effective but can be expensive to implement. Further, with the ever increasing emphasis towards higher power levels in the cell, it becomes more and more difficult to effectuate them in a way which does not eventually cause other problems in cell operation.

OBJECTS OF THE INVENTION

It is an object of this invention to provide an electrode having a lower electrical contact resistance between its components.

It is a further object of this invention to provide a method for reducing the contact resistance between copper and titanium or nickel.

These and other objects of this invention will become apparent from the following description and the appended claims.

BRIEF DESCRIPTION OF THE INVENTION

The objects of the present invention are met by providing an electrode for use in an electrolytic cell, said electrode being comprised of an internal central copper conductor and an external element, said element being selected from the group consisting of titanium and nickel, at least a portion of each having contact surfaces which are held in intimate contact with the other, said conductor and said element having a conductive coating between said contact surfaces, said conductive coating comprising between about 20 to about 30 percent indium and about 80 and about 70 percent gallium, whereby the contact resistance between said conductor and said element is reduced.

DETAILED DESCRIPTION OF THE INVENTION

Figure 1:
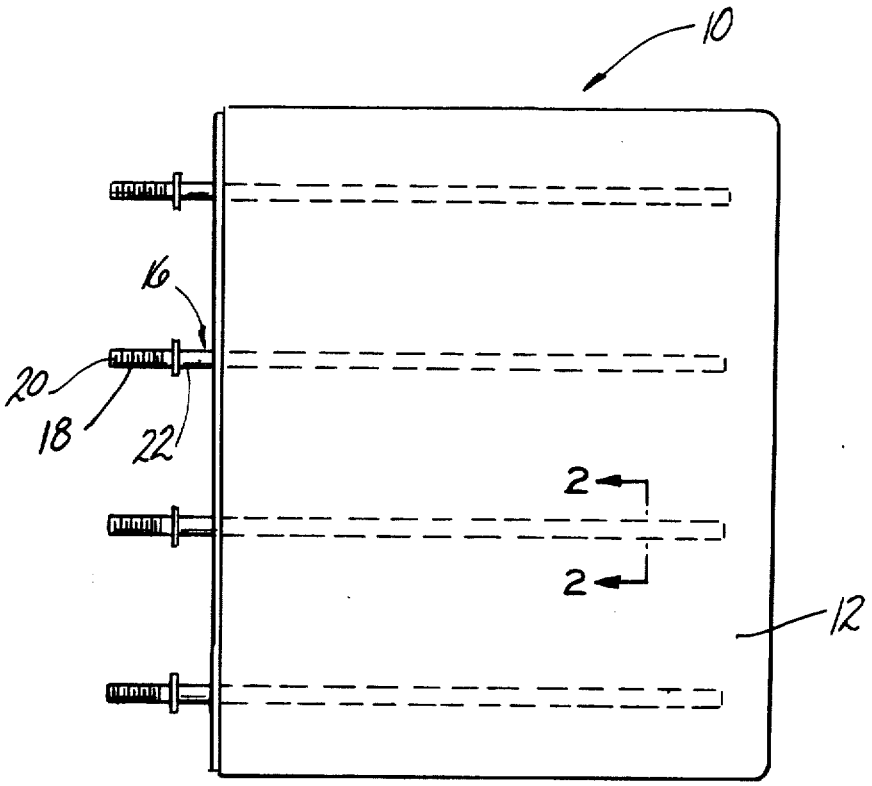
FIG. 1 is a front view of an exemplary electrode assembly as used in a chlor-alkali cell.
Figure 2:
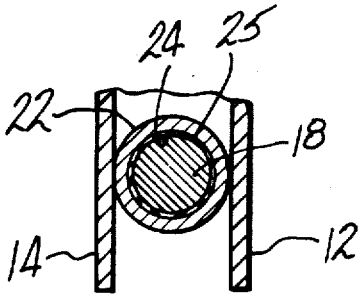
FIG. 2 is a cross section of the central conductor of FIG. 1 along the line 2—2.

The present invention can best be understood by reference to an exemplary structure to which it is applied. This is an electrode of a type described for use in a chlor-alkali cell as shown in U.S. Pat. No. 4,222,831 issued to Specht et al. on Sept. 16, 1980, which is incorporated by reference to the extent relevant hereto. As shown in FIGS. 1 and 2, electrode 10 comprises basically an envelope having a front electrode surface 12 and a back electrode surface 14, said electrode surfaces being either of a solid, mesh, expanded metal or foraminous nature.

Emplaced within the interior of electrode 10 is at least one, but more usually a plurality of central power distributors 16 which comprise an internal conductor 18, preferably of copper, extending substantially across the width of electrode 10. In the embodiment illustrated, this is threadingly adapted at its outermost end 20 to engage a bus bar or cable from an external power system (not shown).

In the preferred embodiment for this invention, the external portions of said front and back electrode surfaces 12 and 14 for anodic use are made from titanium and for cathodic use are made from nickel. Typical materials utilized for internal conduction 18, anode surfaces and cathode surfaces, respectively, are copper C 110, nickel 200 and commercial titanium (Grade 1). Nominal compositions quoted for these materials are:

| | | |
|---|---|---|
| Copper (C 110) | Cu | 99.9% (min.) |
| | O | 0.005% (max.) |
| Nickel (200) | Ni + Co | 99.0% (min.) |
| | C | 0.15% (max.) |
| | Cu | 0.25% (max.) |
| | Fe | 0.40% (max.) |
| | Mn | 0.35% (max.) |
| | Si | 0.35% (max.) |
| | S | 0.01% (max.) |
| Titanium (Gr. 1) | Ti | 99.6% (min.) |
| | N | 0.3% (max.) |
| | C | 0.10% (max.) |
| | H | 0.015% (max.) |
| | Fe | 0.2% (max.) |
| | O | 0.18% (max.) |

However, other similar metals may be used if desired.

As shown in FIG. 2, internal conductor 18 is surrounded by an external element 22 which is a concentric, intimate physical sheath in contact with internal conductor 18. External element 22 is also in more or less continuous electrical contact with front and back surfaces 12 and 14.

Both nickel and titanium are known to form tightly adherent surface oxide layers which will act to electrically insulate the interior contact surface of element 22 from the mating exterior surface of internal conductor 18. This acts to raise the contact resistance between the two, thus increasing the voltage drop across interstitial area 24.

In the process of this invention, such contact resistance losses between internal conductor 18 and external element 22 are substantially reduced by coating the mating surfaces of said conductor 18 and said element 22 with a thin layer of a conductive coating 25, said coating acting to fill interstitial area 24. Conductive coating 25 is a liquid metal mixture comprised of between about 20 and about 30 percent indium by weight and between about 80 and about 70 percent gallium by weight, and preferably between about 23 and about 26 percent indium and between about 77 and about 74 percent gallium. Conductive coating 25 is a highly fluid eutectic having a melting point of approximately 18° C. so that it can be easily applied to said surfaces even at room temperature. Further, unlike mercury or other low melting alloys, conductive coating 25 does not immediately amalgamate or otherwise act to bond conductor 18 and external element 22 together.

Conductive coating 25 is preferably applied to relatively clean surfaces and may be wiped on with a suitable applicator such as a paint brush, cotton swab or wiping cloth. For larger areas, squeegees or suitably designed spray equipment may also be used. Where the surfaces are contaminated, some degree of precleaning is required to promote good wetting. For light dirt, this may comprise operations such as degreasing or washing with strong detergents. For more heavily contaminated surfaces, particularly heavily oxidized surfaces, acid etching or a light dressing with an abrasive-containing material, such as an abrasive impregnated foam or fine sandpaper having a grit size between about 80 and about 400, may also be utilized. Further, it is found that where the abrasive containing material itself is either impregnated or coated with said conductive coating, oxide removal and application can be conducted more or less simultaneously. All of these operations can be conducted at room temperature due to the low melting point of the eutectic composition. The surfaces should be dry prior to said application, and any debris or excess coating material remaining after the surfaces have been evenly coated, removed.

To minimize galvanic corrosion problems resulting from contact with the anolyte or catholyte solutions, external element 22 is preferably made from the same material as that used for said surfaces, i.e. titanium for anodic use and nickel for cathodic use. Further, to both maximize current transfer and promote structural rigidity, external element 22 is usually welded to said front and back surfaces.

Utilizing conductive coating 25 in accordance with the process of this invention permits the use of less costly procedures to assemble the basic electrode. Thus, for assembly of electrode 10 shown in FIGS. 1 and 2, the outer electrode surfaces 12 and 14 and external element 22 can be prefabricated without the necessity of having a built-in internal conductor 18. When such an item is needed to complete the assembly, it merely requires that the mating surfaces be coated with conductive coating 25 and the internal conductor 18 then inserted into the interior of exterior element 22 to complete the overall assembly operation. With proper tolerances, interstitial area 24 is completely filled with conductive coating 25 and good electrical contact is established without the necessity of initial, permanent physical bonding between the two structures.

It is not known exactly how conductive coating 25 works but it is postulated that it works by filling interstitial area 24 with conductive material. Where a light oxide is present, it appears to either dissolve or displace said oxide, thus preventing recontamination of the cleaned surface. When the compound is used to fill interstitial area 24 between surfaces of copper and nickel, it is found that the total resistance of a copper-nickel couple is reduced from between about 0.5 and about 0.6 milliohms to between about 0.07 and about 0.21 milliohms. Further, such values do not seem to change much even after long-term contact at a temperature of about 90° C., whereas uncoated couples change rapidly and drastically for the worse in times as short as [for] *four* days or even less.

EXAMPLE 1

Two coupons of copper C 110 strip, each being 0.045"×1"×2" were cleaned by degreasing with methanol and acid etching in a 12 weight percent $H_2SO_4$ solution for about 10 seconds to produce a material having a front to back resistance of about 0.06 milliohms. At the same time, two coupons of nickel 200 alloy, each being 0.055"×1"×2" were cleaned by vapor degreasing in methanol and acid etching in a solution comprising 37.8 milliliters $H_2O$+56.8 milliliters $H_2SO_4$+85.2 milliliters $HNO_3$ for 10 seconds at 35° C. to produce material having a front to back resistance of about 0.23 milliohms. After being rinsed with distilled water and dried, an area of about one square inch of a predesignated mating surface of one copper coupon and one nickel coupon was evenly coated with a thin layer of conductive coating 25 having a composition of about 23% indium and 77% gallium, using a cotton swab applicator after which said coated surfaces were pressed together to form a conductive copper-nickel couple. This was placed in an oven set for a nominal temperature of about 90° C. For purposes of comparison a cleaned but uncoated copper-nickel couple made from the remaining coupons was also placed in the oven. Both couples were also loaded to 10 psi to simulate both thermal and mechanical levels experienced in a typical chlor-alkali cell electrode installation. When assembled, no bonding was experienced with either couple.

The resistance across the couples was periodically measured with results as follows:

| Aging Time | [Cu—Ni Couple Resistance] (Milliohms) Coated | Uncoated |
|---|---|---|
| 0 days | | 0.55 |
| 1 day | 0.21 | |
| 3 days | 0.19 | |
| 4 days | | 2.80 |
| 6 days | | 63.50 |
| 8 days | 0.21 | |
| 10 days | 0.07 | |
| 11 days | | 142.5 |
| 15 days | 0.19 | |
| 17 days | | 135.6 |
| 25 days | 0.14 | |

The results of this example show that whereas the contact resistance of the untreated couple increased rapidly, that of the treated [coupled] *couple* remained stable and may have actually decreased slightly after 25 days of testing.

EXAMPLE 2

The procedure of Example 1 was repeated with the nickel coupon being replaced with 0.0385"×1"×2" titanium (Grade 1) coupons having, after etching, a front to back resistance of about 1.75 milliohms.

Results obtained are given below:

| Aging Time | [Cu—Ni Couple Resistance] (Millohms) Coated | Uncoated |
|---|---|---|
| 4 days | 2.60 | 170 |
| 8 days | 0.95 | 190 |

Results comparable to Example 1 were observed. Note, however, how rapidly and to what degree the electroresistant oxide coating builds up on the titanium surface.

EXAMPLE 3

The procedure of Example 2 was followed with the titanium being replaced by titanium coupons containing a 0.1 micron thick layer of copper sputtered onto the mating surface. This was cleaned using the procedure for copper as detailed in Example 1.

| Aging Time | [Cu—Cu Sputtered Ti Couple Resistance] (Milliohms) Coated | Uncoated |
|---|---|---|
| 0 days | | 0.4 |
| 1 day | 0.98 | 4.4 |
| 3 days | 1.03 | |
| 4 days | 0.63 | 50.5 |
| 6 days | | 60.5 |
| 8 days | 0.63 | |
| 10 days | 0.64 | |
| 11 days | | 70 |
| 15 days | 0.65 | |
| 17 days | | 70 |
| 25 days | 0.85 | |

This shows that sputtering copper on titanium produces a system which while superior to a Cu–Ti couple will still quickly break down on long-term exposure to the temperature and pressure environmental conditions of a cell to achieve uncoated contact resistance values substantially higher than those found with coated couples.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An electrode for use in an electrolytic cell, said electrode being comprised of an internal copper conductor and an external element, said element being selected from the group consisting of titanium and nickel, at least a portion of said copper conductor having contact surfaces which are held in intimate contact with contact surfaces of said external element, said conductor and said element having at an area of contact a conductive coating between said contact surfaces of said conductor and said element, said conductive coating being comprised of a mixture of between about 20 and about 30 percent indium by weight and about 80 and about 70 percent gallium by weight, whereby the contact resistance between said conductor and said element is reduced.

2. The electrode of claim 1 wherein said conductive compound is comprised of between about 23 and about 26 percent by weight of indium and about 77 and about 74 percent by weight of gallium.

3. An electrolytic cell containing the electrode of claim 1.

4. The electrode of claim 1 wherein the titanium further has a layer of copper on said contact surface.

*5. An electrode for use in an electrolytic cell said electrode comprising in combination:*

*(a) copper conductor means having at least a first mating contact surface for conducting electrical energy;*

*(b) electrolyte corrosion-resistant means having a second mating contact surface which contacts the conductor means along the first mating surface to prevent corrosion of the conductor means, the corrosion-resistant means being selected from the group consisting of titanium and nickel;*

*(c) electrode surface means connected to the conductor means; and*

*(d) an electrically conductive coating in contact with the at least first mating contact surface of the copper conductor means and the second mating contact surface of the corrosion-resistant means, the electrically conductive coating being a liquid-metal mixture comprising between about 20 and about 30 percent indium by weight and between about 80 and 70 percent gallium by weight such that the electrical contact resistance between the conductor means and the corrosion-resistant means is reduced.*

*6. The electrode according to claim 5 wherein said conductive compound is comprised of between about 23 and about 26 percent by weight of indium and about 77 and about 74 percent by weight of gallium.*

*7. The electrode according to claim 5 wherein the corrosion-resistant means is made of titanium and has a layer of copper on the mating contact surface.*

*8. An electrode for use in an electrolytic cell having copper conductor means with at least a first mating contact surface for conducting electrical energy, electrolyte corrosion-resistant means having a second mating contact surface which contacts the conductor means along the first mating contact surface, the corrosion-resistant means being selected from the group consisting of titanium and nickel, and electrode surface means connected to the conductor means, the improvement comprising:*

*an electrically conductive coating in contact with the at least first mating contact surface of the copper conductor means and the second mating contact surface of the corrosion-resistant means, the electrically conductive coating being a liquid-metal mixture comprising between about 20 and about 30 percent indium by weight and between about 80 and about 70 percent gallium by weight such that the electrical contact resistance between the conductor means and the corrosion-resistant means is reduced.*

*9. The electrode according to claim 8 wherein said conductive compound is comprised of between about 23 and about 26 percent by weight of indium and about 77 and about 74 percent by weight of gallium.*

*10. The electrode according to claim 8 wherein the corrosion-resistant means is made of titanium and has a layer of copper on the mating contact surface.*

* * * * *

UNITED STATES PATENT AND TRADEMARK OFFICE

CERTIFICATE OF CORRECTION

PATENT NO. : Re. 32,078

DATED : February 4, 1986

INVENTOR(S) : Woodard, Jr. et al.

It is certified that error appears in the above-identified patent and that said Letters Patent is hereby corrected as shown below:

In column 2, at line 29 after "to" and before "about" insert --and--.

In column 5, at line 35 delete "[Cu-Ni Couple Resistance]" and insert --[Cu-Ti Couple Resistance]--.

In column 5, at line 36 delete "(Millohms)" and insert --(Milliohms)--.

In column 5, at line 59 after "4 days" and before "50.5" delete "0.63".

In column 6, at line 23 delete "an" and insert --the--.

Signed and Sealed this

*Fifteenth* Day of *July 1986*

[SEAL]

*Attest:*

DONALD J. QUIGG

*Attesting Officer*

*Commissioner of Patents and Trademarks*